Sept. 24, 1957 R. I. ROTH 2,807,415

RECORD PERFORATION ANALYZING MEANS

Filed June 1, 1956 5 Sheets-Sheet 1

INVENTOR.
ROBERT I. ROTH

BY F. W. Lowenitzer

ATTORNEY

RECORD PERFORATION ANALYZING MEANS

Filed June 1, 1956

5 Sheets-Sheet 2

*INVENTOR.*

ROBERT I. ROTH

*BY* A. W. Lowinitzer

ATTORNEY

Sept. 24, 1957 R. I. ROTH 2,807,415

RECORD PERFORATION ANALYZING MEANS

Filed June 1, 1956 5 Sheets-Sheet 3

Sept. 24, 1957 R. I. ROTH 2,807,415

RECORD PERFORATION ANALYZING MEANS

Filed June 1, 1956 5 Sheets-Sheet 4

RECORD PERFORATION ANALYZING MEANS

Filed June 1, 1956 5 Sheets-Sheet 5

United States Patent Office 2,807,415

Patented Sept. 24, 1957

2,807,415

RECORD PERFORATION ANALYZING MEANS

Robert I. Roth, Briarcliff Manor, N. Y., assignor to International Business Machines Corporation, New York, N. Y., a corporation of New York

Application June 1, 1956, Serial No. 588,838

8 Claims. (Cl. 235—61.11)

This invention relates to perforation analyzing means and more particularly to the type which analyzes the perforated record for the purpose of deriving differentially timed work pulses.

It is the main object of the present invention to provide a card analyzing brush structure in which each brush is capable of completing, independent of other brushes, the impulse work circuit at that point, and to effect this by causing the brush to act through the hole of a card as a bridge or shunt between two contact elements underneath the card hole, instead of making contact with a single contact element underneath the hole as in prior art arrangements exemplified in the patent to R. E. Page et al., No. 2,484,114.

In accordance with the present invention, and an object therefor, the card brushes are individual to each index point and are insulatably carried by a support plate so that each brush overlies a related pair of contact elements underneath the card hole which are adapted to be shunted by the brush as the latter passes through a hole, and said series of contact elements are serially in the impulse transmitting circuit; the shunting of the remainder of them at a differential time transmitting the desired differentially timed impulse.

It is a further object of the present invention to arrange to have those contact elements which are not initially shunted by the brushes to be bridged or shunted by relays, preferably by electro-mechanically operated means, and to cause the energization of the coils of said electro-mechanically operated means by time-operated cam contacts.

It is to be noted that with the basic construction the primary change to analyze differently coded cards is the appropriate selection of the time-operated cam contacts, and it is therefore an object of the present invention to provide sets of differently operated cam contacts for various forms of coded cards or records, such as the conventional "IBM" single hole per digit card; a card utilizing the 0, 1, 2, 4, 7 code; or the 0, 1, 2, 4, 8 code, these three different modifications showing the wide flexibility possible with the instant basic analyzing arrangement.

As a general description of the present invention, the analyzing means consists of a reciprocably operated frame member which carries a plurality of plates of insulating material, one plate being provided for each column of the card and each of said plates carrying a plurality of individual analyzing brushes, there being one for each index point position in a column and adapted when said frame members is moved against the card underneath the brushes to pass individually through the related holes. In contrast with prior art arrangements, the contact elements or members engaged by the brushes through the holes do not consist of a single contact member but a pair; these being insulated from each other and adapted as the brush projects through a hole to be bridged or shunted by the brush.

A pair of contact members is provided for each brush and are serially in an impulse transmitting work circuit, it being obvious, therefore, that upon the initial position of the brushes to contact said contact members said work circuit is completed at various points in the work circuit, namely, at the pairs of contact members where each of the brushes has passed through a hole.

To improve the efficiency of contact between the brushes and contact members, it is preferable to construct each brush of dual strands, that is, each strand may move independently of the other and have them carried by a common ferrule fitting in a slot in the insulating support plate. However, if so desired, a brush having a single group of strands may be provided as long as the brushes shunt or bridge the related pair of contact members.

It is obvious, therefore, that the work circuit is not fully completed by the brushes and pairs of contact members which have been shunted, due to the fact that the contact members related to the other brushes that have encountered the stock portion of the card are not bridged or shunted. To this end, time-operated means is provided to close relay contacts to bridge or shunt the remainder of said contact members.

This can be conveniently effected by one construction which consists of a contact wire carried by each contact member and moved mechanically so as to strike the adjacent contact member and provide the desired electrical shunt.

In the present invention bail plates are adapted to move the related series of shiftable contact wires for the same index point position, which bail plates are carried by a rock shaft operated by cams rotated by rotary solenoids. The coils of said rotary solenoids are energized at differential times by means of cam-operated contacts, the timing of which is so selected as to complete at differential digit times the shunting of those contact members which have not been initially shunted by the analyzing brushes. The energization of the coils of the rotary solenoids is effected by independent energizing circuits completed at differential times by time-operated cam contacts. The timing of such cams is so arranged as to close the impulse circuit to energize the desired coils of the rotary solenoid.

The wide flexibility of the present arrangement, that is, its adaptability to analyze different types of coded cards requires only a change in the timing of the cam-operated contacts and the wiring of the contact elements, the basic analyzing structure shown in Fig. 1 remaining the same, irrespective of the type of card to be analyzed. The diversity and flexibility are amply illustrated herein by showing modifications adapted to analyze three different types of cards. However, in each arrangement the same basic principle is embodied, that is, the partial closing of contact members in a work circuit by one or more brushes dependent upon the particular brushes passing through the holes, and time-operated circuit closing means adapted to bridge or shunt the complementary contact members at successive differential times. Whenever said time-operated means bridges contact members which are complementary to those initially bridged by the brushes, then said work circuit is completed at a differential time. The use of such impulse work circuits is well known in the art. It is only necessary to state that use may be made of such impulses in electrical accounting machines to control the setting of a printing mechanism, the entry in accumulators, etc.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a transverse sectional view of an analyzing mechanism of a well known form modified to incorporate the present invention. This view shows the relationship of the brushes and contact members for bridging pairs of contact members by the brushes and shows the electro-magnetically operated means for bridging remaining pairs of contact members which are complementary to those pairs initially shunted by the analyzing brushes.

*Analyzing mechanism*

Figure 1:
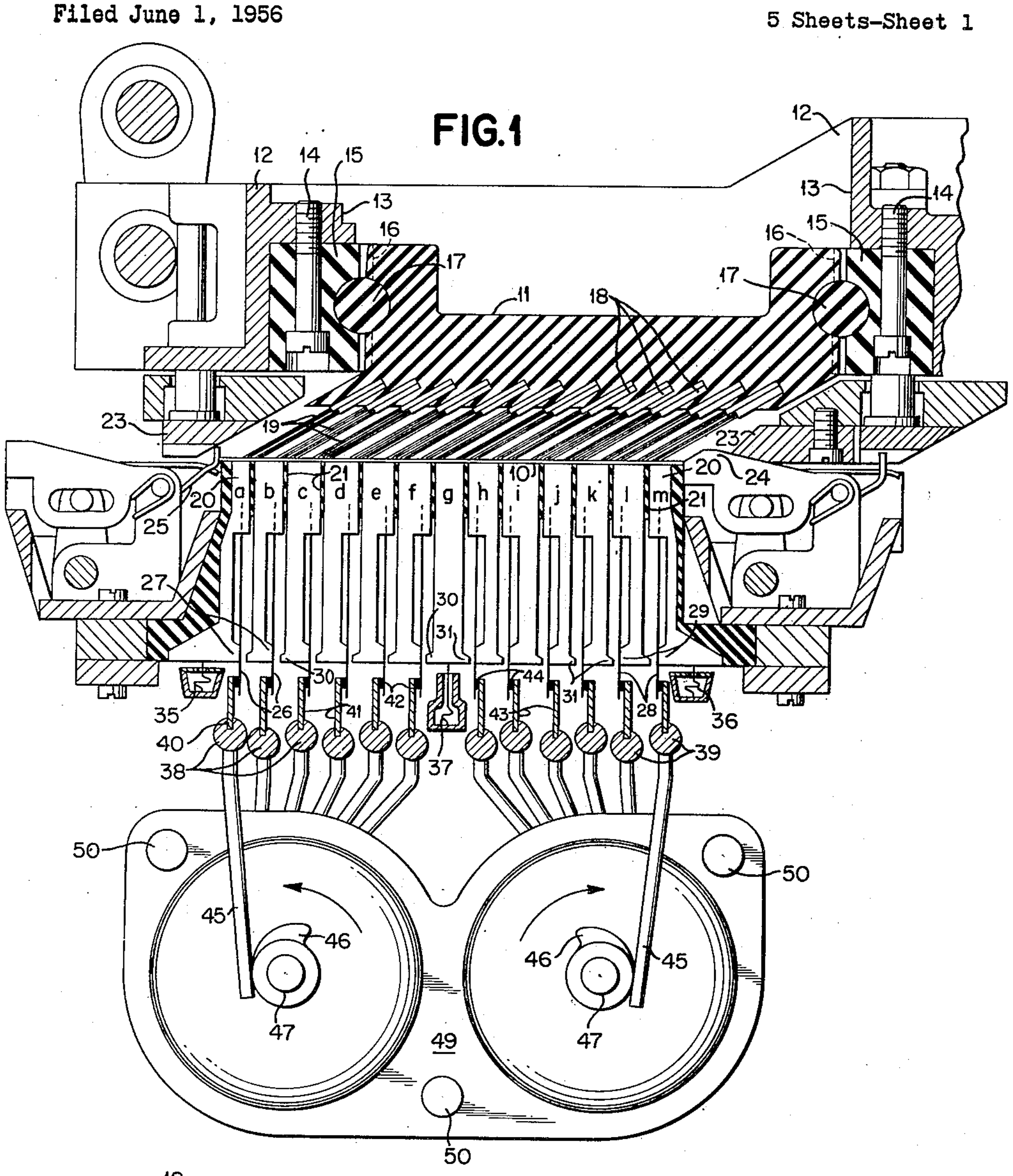

The analyzing mechanism, which is part of the structure for translating the perforations in the records into differentially timed impulses for different forms of coded cards, is preferably of the type which analyzes the records while they are at rest. Conveniently it may comprise the type shown in the patent to R. E. Page et al., No. 2,484,114; Figs. 1 to 6 herein showing suitable modifications of the analyzing mechanism shown in the above patent for carrying out the present invention. The present analyzer is adapted to analyze the type of perforated record shown in the patent to C. D. Lake, No. 1,772,492, granted August 12, 1930. In general the card 10 (Figs. 1 and 7) has perforations which are rectangular in shape and arranged in 80 vertical columns and in 12 horizontal rows through which perforations electrical circuits are closed to control operations of the machine.

To illustrate the usefulness of the present invention the analyzer shown herein is not only adapted to analyze a type of card shown in the C. D. Lake patent, No. 1,772,492, which represents 80 characters but also to analyze a duo-deck form of card in which the characters are coded to double the capacity of character representation.

In more detail the analyzing means shown in the aforementioned patent to R. E. Page et al., No. 2,484,114, and to G. F. Daly, No. 2,514,031, is provided with a plurality of analyzing units, one for each vertical card column, which are carried by a reciprocable frame member 12 consisting of a single metallic casting. The frame member 12 holds 80 analyzing units for a corresponding number of vertical card columns. Each analyzing or brush carrying unit comprises a plate 11 of insulating material which, in thickness, is less than the width of a card column and the plurality of insulating brush support plates 11 are mounted, separated from each other, on the frame member 12. The 80 analyzing units are mounted to fit through a rectangular opening 13 formed in the frame member 12. By means of mounting screws 14 transverse bars 15 are carried by the frame member 12 and said bars 15 are provided with slots 16 which receive the insulating plates 11 in such manner that they are suitably spaced from each other, but correlate the brushes 19 carried by plates 11 with the columns of index point positions.

The brush carrying plates 11 are locked in position on the frame member 12 by rods 17 of insulating material which fit in semi-circular cutout portions formed at the ends of the plates 11 and along the edge of each insulating bar 15.

Figures 2, 3, 4:
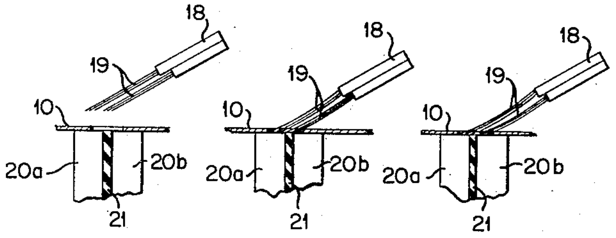
Fig. 2 is a detail view showing the normal relationship between a pair of brush strands of the brush and related pair of contact members.
Fig. 3 is a detail view showing the initial non-shunting contact by the dual strand brush, only one brush strand contacting one of the related pairs of contact members through a hole of the card and the other brush strand contacting an insulating plate between the contact members.
Fig. 4 is a view similar to Fig. 3 but showing the slight shift given to the brush to cause both brush strands to make firm contact with and shunt the pair of related contact members.
Figure 5:
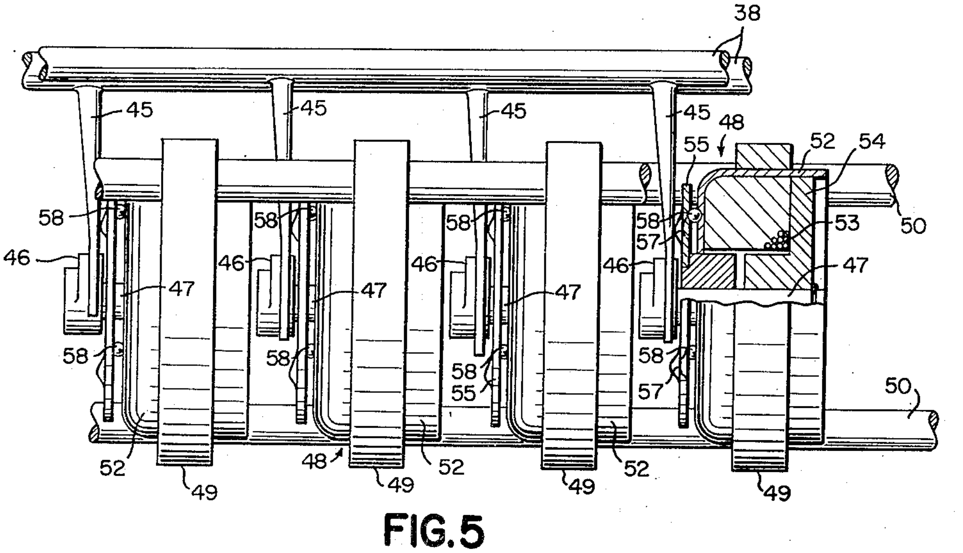
Fig. 5 shows an assembly of the electro-magnetically operated devices for rocking bail shafts to shift wire contacts to bridge the remaining pairs of contact members.

Each brush carrying plate 11 is provided with angular slots adapted to receive metal ferrules 18 (Fig. 1), each of which holds an analyzing brush 19 comprising a pair of strands. The brushes are preferably inclined in the direction of card feed and are normally elevated as shown in Fig. 2 while the cards are being fed to analyzing position.

The terminal ends of the analyzing brushes 19 make electrical contact with pairs of contact members **20*a*—20*m*, there being two of these for contact with each analyzing brush 19** at each index point position.

Differing from the construction of the analyzing brushes in the aforementioned patent to R. E. Page et al., No. 2,484,114, each analyzing brush consists of two strands, each being normally positioned over a pair of contact members, as, for example, **20*a* and 20*b* in Fig. 2. Adjacent contact members are separated by a strip 21 of insulating material and each series of contact members 20*a*—20*m* for each column is separated from the adjacent series by an insulating strip 22** (see Fig. 6).

Figure 6:
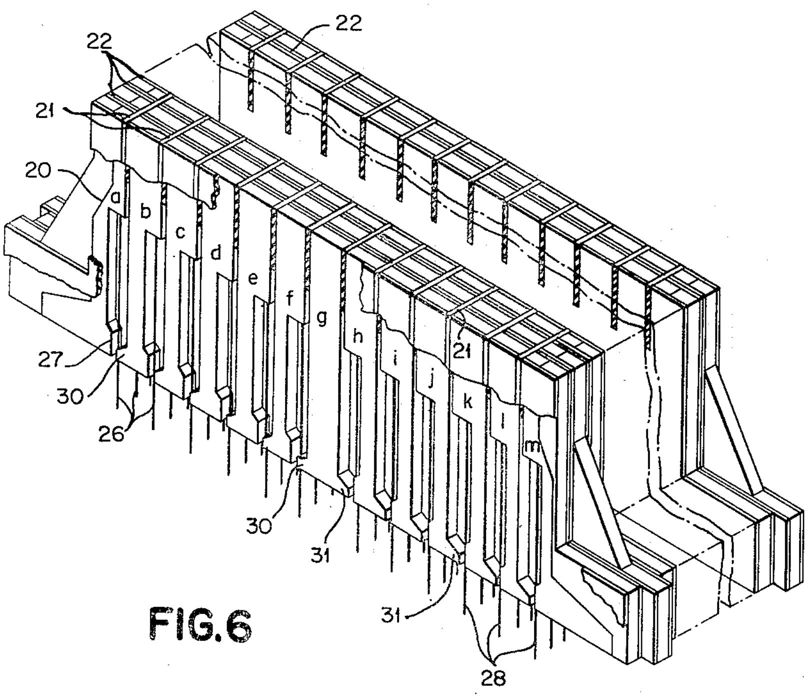
Fig. 6 is a perspective view showing an assembly of the contact members for a plurality of orders to thereby form a smooth bed plate over which a card to be analyzed is fed.

Fig. 6 shows the manner of an assembly of the 80 series of contact members 20 and the insulating strips 21 and 22. When suitably clamped they form a contact unit assembly underneath the brushes 19 with a flush top to enable unobstructed feeding of a card to be analyzed.

When a brush 19 is in its normal upper position, as shown in Fig. 2 by way of example for a single brush, the two strands are over the related contact members **20*a* and 20*b* and when said brush is lowered one strand makes contact with the associated contact member 20*a*, as shown in Fig. 3 and the other strand contacts an insulating strip 21 between contact members 20*a* and 20*b*. A continued movement of the analyzing frame down and to the right merely bends brushes as shown in Fig. 4 and shifts both strands to make firm contact with the related contact members 20*a* and 20*b*. The patent to G. F. Daly, No. 2,514,031, dated July 4, 1950, discloses an analyzer for shifting analyzing brushes in this manner. The purpose of this brush strand construction is to effect herein, as shown by way of example in Figs. 1, 2, 3 and 4, a series circuit from one of the contact members 20*a* through one strand of an analyzing brush 19, the ferrule 18, the other strand of the brush, thence to the adjacent contact member 20*b*. Since an adjacent contact member 20*b* may also be engaged by the strand of an adjacent analyzing brush 19, the circuit may be continued serially. Hence, it is evident that in accordance with the perforations analyzed the circuit is serially completed at that point through one of the brushes 19, and adjacent contact members 20** for a purpose to be subsequently explained.

The means for depressing the frame member 12 in a timed operation of the machine may consist of any suitable means, it only being essential that the frame member is in lowered position between 105 and 315° (see Figs. 9, 12 and 15) of the machine cycle during which time the desired digit electrical impulses are being transmitted. Furthermore, any suitable means may be provided for feeding the cards in a successive manner to the present analyzing means and since it forms no part of the present invention such feeding means are not shown. Such feeding means should feed a card to the analyzing means so that the brushes remain in contact with the card during the time the electrical impulses are transmitted and thereafter feed said card out of the analyzing means in order to receive a successive card.

It is desirable to provide means to hold the cards stationary during an analyzing operation and to this end the patent to R. E. Page et al., No. 2,484,114, also includes clamping plates 23 which press the card 10 against the surface of the card feeding bed. Incidentally, other expedients to hold the card in proper analyzing position consist of a depressible card stop 24 which is depressed as the card is fed to the left in Fig. 1 to analyzing position against shiftable aligning stops 25 which are actuated to the right slightly to move any disaligned card against the card stops 24 at the right.

Each of the contact members **20*a* to 20*f* (Fig. 1) has fitted in the top portion a flexible contact wire 26 and each flexible contact wire 26 is biased to the left so as to normally rest against a foot 27 of the same contact member. Likewise, each contact member 20*h*–20*m* has fitted in the top portion a flexible contact wire 28 which is biased to the right to rest against a foot 29 of the same contact member. It will be seen that when a contact wire 26 is shifted to the right it will make electrical contact with the foot 30 of the contact member at the right, whereas, when a contact wire 28 is shifted to the left it will make contact with the related foot 31** of the adjacent contact member.

It will be noted that the contact wire 26 carried by the contact member **20*f* will make contact with the foot 30 of the contact member 20*g*, whereas the contact wire 28 carried by contact member 20*h* will make contact with the foot 31 of the contact member 20*g* for a purpose to be described. Thus, it is evident that the movement of contact wire 26 to the right to engage the foot 30 of the adjacent contact member will electrically bridge or shunt adjacent contact members just as the two strands of brush 19 would. In the same way the movement of the contact wire 28 to the left to engage a foot 31** of an adjacent contact member will electrically shunt or bridge adjacent contact members.

The contact arrangement just described is a convenient means for electrically shunting a pair of contact members, and those which are so shunted at a differential time are complementary to those initially shunted by the brushes 19 and thus both will complete a series circuit at a differential time.

Electrical contact is made to each contact member **20*a* by means of a related terminal wire 35, there being one terminal wire 35 for each contact member 20*a* and thus for each column. Electrical contact to a contact member 20*m* is provided by a similar terminal wire 36, the series circuit then being between the wires 35 and 36. However, for duo-deck cards the terminal wire 37 for contact member 20*g* provides two circuits, one between the wires 35 and 37 and another one between the wires 36 and 37**.

Underneath the contact assembly and relay contacts are six rock shafts 38 which are adapted to be rocked first clockwise, then counterclockwise and a series of six shafts 39 which are adapted to be rocked counterclockwise and then clockwise. Each of said shafts 38 is provided with a longitudinal slot 40 in which is fitted a bail plate 41 carrying an insulating plate 42 bearing against the related contact wires 26. In the position in Fig. 1 the rock shafts 38, bail plates 41 and insulating plates 42 are in such position that each contact wire 26 freely rests against the foot 27 of the same contact member. However, when a shaft 38 is rocked clockwise it is evident that said plate 41 will shift all of the wires 26 for the 80 columns to the right so as to cause each to make contact with the foot 30 of the adjacent contact member, thereby effecting the electrical bridge or shunt. In a similar manner the shafts 39 are rocked initially counterclockwise to cause bail plates 43 and insulating plates 44 mounted thereon to shift the contact wires 28 to the left to thereby provide the desired electrical bridge or shunt. Thus, at a desired time in the operation of the machine the six left-hand bail plates 41 provide means for electrically shunting adjacent contact members, whereas the six right-hand bail plates 43 also provide means to effect the desired electrical bridge or shunt.

Since the principle of operation requires the electrical shunt at differential times and for selected pairs of contact members 20, it is necessary to provide means to rock shafts 38 and 39 at the desired times. This is preferably effected by electro-mechanical means best shown in Figs. 1 and 5. Each shaft 38 and 39 is provided with a cam follower 45, each of which is urged by the spring contact wires 26 or 28 to bear against a cam 46 secured to a rock shaft 47 of a well known type of rotary solenoid 48, known commercially as the "Ledex" rotary solenoid. The solenoid assemblies 48 are assembled in holes of mounting plates 49 which are suitably supported by cross-bars 50.

Since the "Ledex" rotary solenoid is well known in the art and shown in Patent No. 2,496,880, issued February 7, 1950, to George H. Leland, it is unnecessary to give complete details of operation. In general, it consists of a case 52 (Fig. 5) in which there is fitted an armature coil 53 held in the case 52 by a retainer ring plate 54.

Slidably mounted in the case 52 is the shaft 47 to which is secured the cam 46 and an armature plate 55 which is outside of the case 52 but is adapted to be attracted by the energization of the coil 53. The armature plate 55 is provided with three inclined slots 57 in which fit steel balls 58 fitting in depressions in the stationary case 52. The energization of the coil 53 attracts said armature 55 and the co-action of the inclined slots 57 with the stationary aintifriction balls 58 carried by the case 52 will cause rotation of the armature plate 55 and shaft 47 as the armature plate is attracted by the coil 53. This rotation continues until the ends of the inclined slots 57 are engaged by the anti-friction balls 58. Thus, there is a conversion from a straight line attraction of the armature plate 55 to a rotary movement. This rotary movement of shaft 47, first in one direction and then the other is, of course, effected by the energization of the electro-magnetic coil 53 and its subsequent deenergization assisted by a spring, not shown.

By timing the energization of the respective coils 53 the cams 46 may be reciprocated and the desired series of contact wires 26 or 28 may effect the electrical shunt between adjacent contact members. In those positions where a brush 19 has not initially electrically shunted adjacent contact members 20, this will be effected at a differential time by shifting the contact wires 26 or 28. Obviously, if this is effected at a differential time for contact members 20 which were not initially shunted, then at such differential time a series circuit will be completed. This circuit is the differentially timed impulse circuit and is employed as a work circuit to effect desired operations in an electrical accounting machine.

The manner of operation of the improved analyzer and impulse emitter will best be understood by reference to the electrical wiring diagrams which show the mode of operations for three types of cards.

*Operation of analyzer and emitter for 80-column card*

Figure 7:
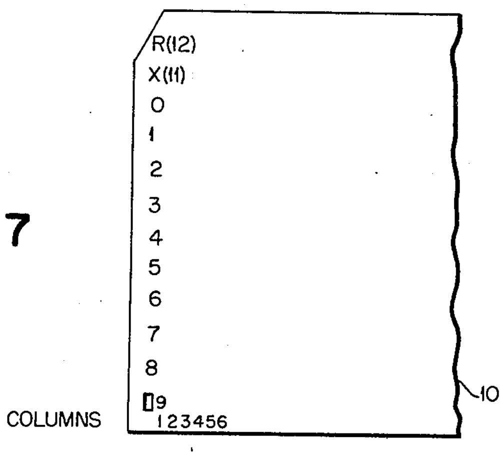
Fig. 7 is a partial view of a conventional 80-column card.

The first arrangement to be described shows the present invention in a form of analyzing mechanism and emitter provided for analyzing 80-column "IBM" tabulating cards shown in the patent to C. D. Lake, No. 1,772,492. A fragmentary portion of the card 10 is shown in Fig. 7 wherein it will be seen that a vertical column designates from top to bottom R, X, 0–9. Generally a single perforation in each column represents the desired character, although for certain types of accounting machines it is desirable to have some designations represented by coded combinations of perforations which are also analyzed by the present analyzing mechanism.

Figure 8:
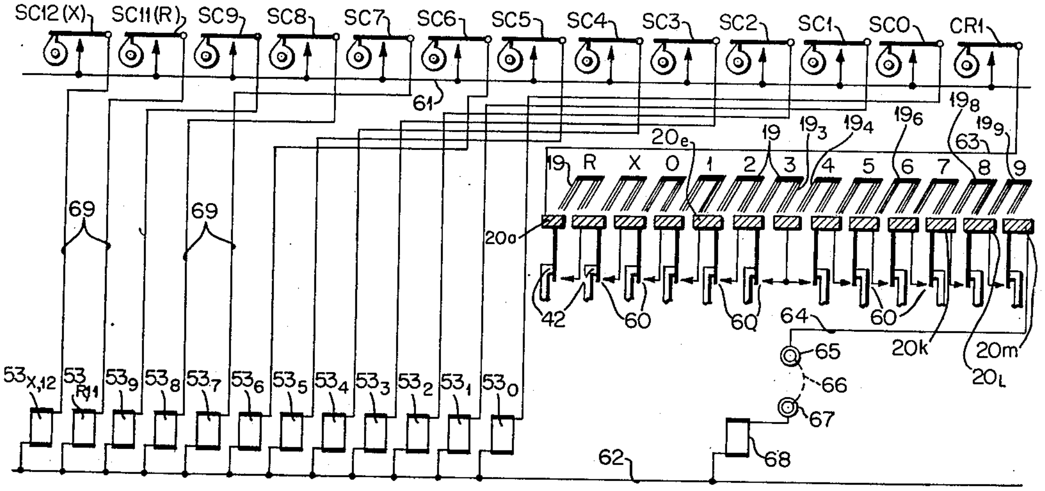
Fig. 8 is a wiring diagram of the circuit connections for analyzing an 80-column card.

In order to avoid a repetition of the showing of the detailed structural arrangement, the analyzing devices are shown diagrammatically in the wiring diagram of Fig. 8 wherein it will be seen that each dual strand analyzing brush 19 shunts or bridges a pair of contact members 20 when such brush passes through a perforation. At certain times in the operation of the machine the shifting of the contact wires 26 or 28 to the left or right (see Fig. 1) to engage foot portions of an adjacent contact member will, in the same manner as the brush 19, shunt or bridge a pair of the contact members 20. In the wiring diagram of Fig. 8 and others this electrical shunting means is shown for simplicity as relay contacts 60.

Figure 9:
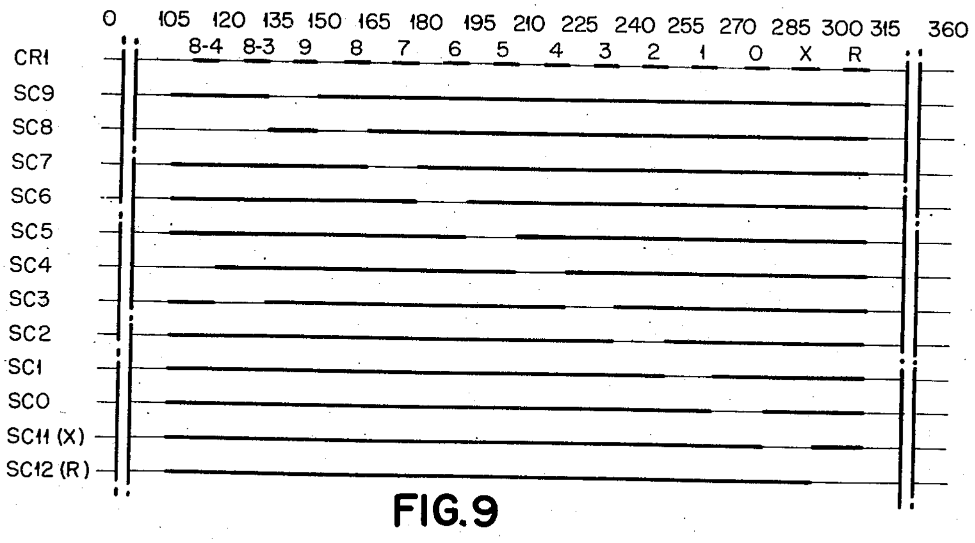
Fig. 9 is a timing diagram for the circuit of Fig. 8.

Reference numerals 61 and 62 represent the supply lines and from the line 61 a circuit is extended through CR1 cam contacts which have the impulse timing shown in Fig. 9 and provide the source of differentially timed electrical impulses which are selected according to the brushes which encounter perforations in the card. The circuit extends through CR1 cam contacts, wire 63 to the left-hand contact member 20*a*. From the right-hand contact member 20*m* there is a wire connection 64 to a plug socket 65 and by making a selective plug connection 66 to a plug hub 67 an accumulator or printing control magnet 68 connected to the line 62 may be energized.

Connected to the line side 61 is a series of cam-operated contacts SC9–0, 11 and 12 which have the timing shown in Fig. 9 for a purpose which will be presently evident. From each contact there is an individual wire connection 69 to a coil 53 having the same subscript designation. It will be recalled that coils 53 are part of the electro-magnetic device for closing the relay contacts 60. The manner of transmitting selected differentially timed impulses will best be understood by reference to certain examples. Assuming that the card is perforated at the 9 index point position (see Fig. 7), it will be obvious that the brush $\mathbf{19}_9$ (Fig. 8) will shunt contact members 201 and 20*m* and which shunt is maintained during the time that the CR1 impulses are transmitted.

Referring to Fig. 9, it will be noted that at the 9 impulse time (between 135°–150°) cam contacts SC8–SC0, SC11 and SC12 are closed to effect the simultaneous energization of the magnet coils 53 having he same subscript designation. These coils, by electro-magnetic means previously described in detail, will cause the closure of related relay contacts 60, such contacts being complementary to the shunt effected by brush $\mathbf{19}_9$ passing through the 9 perforation. It is obvious, therefore, that a serial circuit is completed from the contact member 20*a* to the contact member 20*m*, thereby completing the impulse circuit to the magnet 68. If such magnet is a printing control magnet it will cause the printing of the digit 9, or if it is an accumulator clutch control magnet it will cause the entry of 9.

If, however, the record column contains an 8 perforation, brush $\mathbf{19}_8$ (Fig. 8) will shunt 20*k* and 20*l* contacts and at the 8 impulse time cam contacts SC9, SC7–SC0, SC11 and SC12 will cause the energization of related coils 53. The closure of related relay contacts 60 at this impulse time will then complete a series circuit from contact member 20*a* to 20*m*, thereby transmitting and 8 differentially-timed impulse to the magnet 68. It will thus be seen that the brushes 19 effect a partial completion of the circuit and relay contacts 60 complete the circuit to transmit a differentially timed impulse derived from CR1 cam contacts.

In certain forms of printing mechanisms for record controlled machines, certain groups of type are selected by the coded perforations 8–3 and 8–4 and the present analyzing mechanism is adapted to translate the combinations and cause the transmission of a single differentially-timed impulse, represented as 8–4 or 8–3 in Fig. 9. For 8–4 coded holes the brushes $\mathbf{19}_8$ and $\mathbf{19}_4$ partially complete the impulse circuit at two positions by shunting adjacent contact members 20. At the 8–4 impulse time it will be seen that certain SC cam contacts cause the closure of related contacts 60 to thereby shunt the other pairs of contact members 20, finally completing an impulse circuit to the magnet 68 which, in the present instance, is a print control magnet. The transmission of the 8–4 impulse will select a desired group of characters. The operation of the machine when the coded perforations 8–3 are analyzed is precisely the same except that the brushes $\mathbf{19}_8$ and $\mathbf{19}_3$ partially complete the impulse circuit and the SC cam contacts make a final completion of the impulse circuit. The 8–3 impulse is utilized to select another group of punctuation type.

*Operation of analyzer and emitter for duo-deck 1, 2, 4, 8 coded cards*

Figure 10:
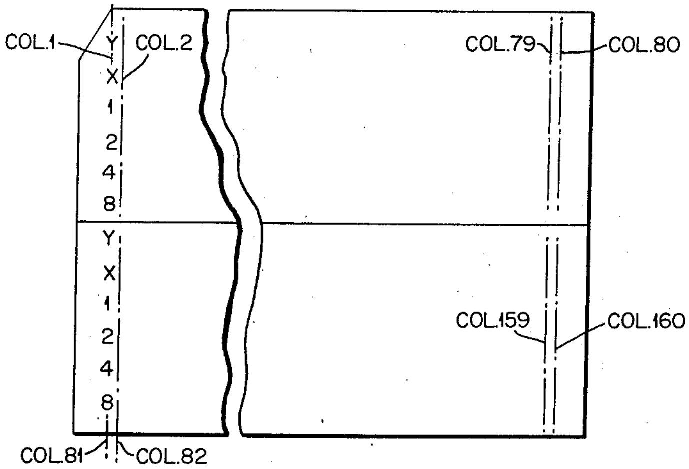
Fig. 10 is a view of a duo-deck card coded according to the 1, 2, 4, 8 code.
Figure 11:
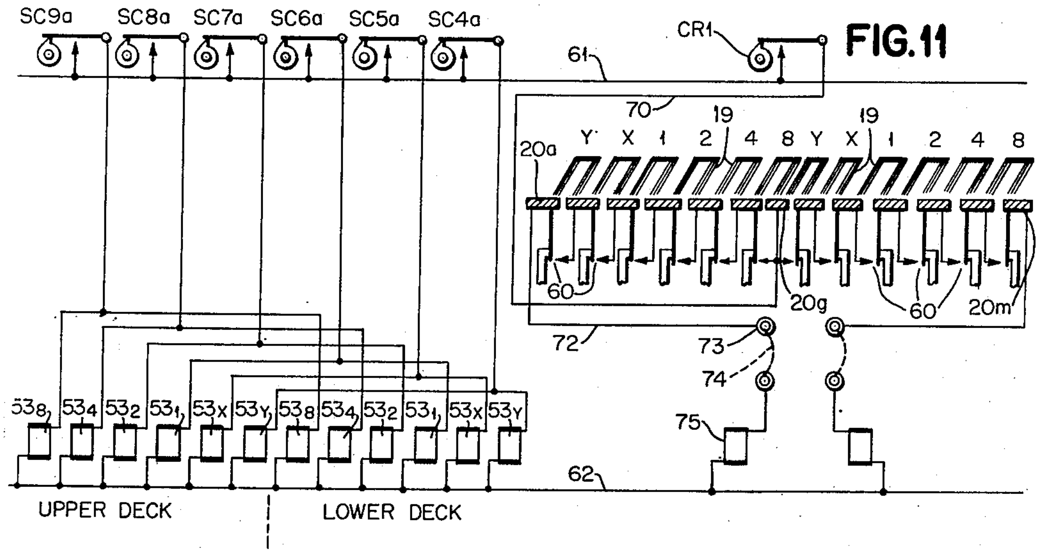
Fig. 11 is a wiring diagram of the circuit connections for analyzing a card using the 1, 2, 4, 8 code.
Figure 12:
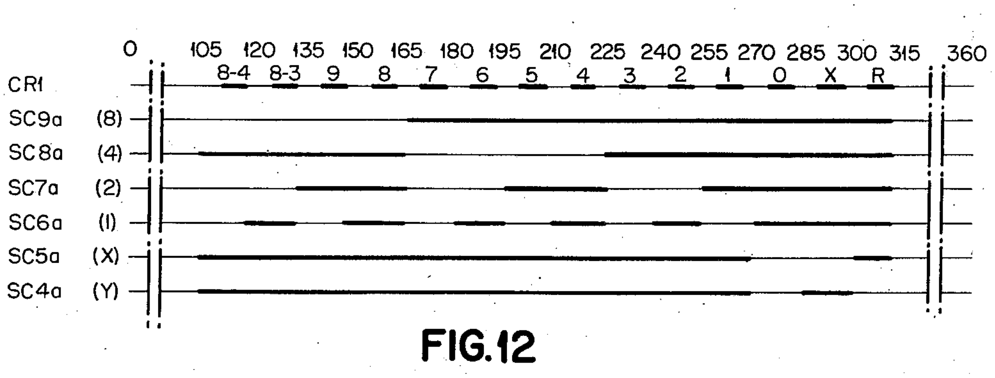
Fig. 12 is a timing diagram for the circuit of Fig. 11.

In order to indicate and show the application of the improved analyzer to duo-deck form of cards, a modification is illustrated in Figs. 10, 11 and 12, which figures represent the duo-deck card, the wiring diagram and the timing diagram respectively.

From Fig. 10 it will be seen that the card is divided horizontally so as to provide 80 card columns, the six index point positions from the top to the bottom of the upper deck being Y, X, 1, 2, 4 and 8. A duplicate arrangement is provided for the lower deck in order that columns 81 to 160 may represent characters. With this arrangement the character representing capacity is doubled. Accordingly, by a suitable coding shown in the table below all of the digits 0–9 may be represented as well as the control designations X and Y. Furthermore, it is also desirable to have an equivalent to the 8–4 and 8–3 coded combination of the "IBM" card and this is provided for in the form of card shown in Fig. 10 by the coding shown below:

TABLE I

| | |
|---|---|
| 8–4 combination | =an 8 perforation plus a 2 perforation plus a 1 perforation |
| 8–3 combination | =an 8 perforation plus a 2 perforation |
| 9 | =an 8 perforation plus a 1 perforation |
| 8 | =an 8 perforation alone |
| 7 | =a 1 perforation plus a 2 perforation plus a 4 perforation |
| 6 | =a 2 perforation plus a 4 perforation |
| 5 | =a 4 perforation plus a 1 perforation |
| 4 | =a 4 perforation alone |
| 3 | =a 2 perforation plus a 1 perforation |
| 2 | =a 2 perforation alone |
| 1 | =a 1 perforation alone |
| 0 | =an X perforation plus a Y perforation |
| 11 | =an X perforation alone |
| 12 | =a Y perforation alone |

It will be seen from the above table that the digits 1, 2, 4 and 8 are represented by single holes alone whereas the other digits require combinations of holes. For example, the digit 3 requires a 2 perforation plus a 1 perforation. The analyzer and coordinated impulse transmitting mechanism are designed to transmit, as shown in Fig. 12, impulses having precisely the same timing as that derived from the "IBM" card. The CR1 cam contacts comprise the source of electrical impulses and are connected to the line side 61. Wire 70 from the other side of such contacts is electrically connected to the center contact member 20*g*. The circuit sub-divides at this point and may be completed for the upper deck between the contact members 20*a* and 20*g* and for the lower deck between contact members 20*g* and 20*m*. Since the mode of operation is precisely the same for both decks, it will be explained for only the upper deck, in which case the wire connection 72 from the contact member 20*a* extends to a plug hub 73 so that by a plug connection 74 impulses may be transmitted to a control magnet 75 connected to the line side 62.

The manner of transmitting differentially timed impulses from the coded card will now be explained in connection with several examples. The same principle of operation, as previously described, is also embodied in the arrangement of Fig. 11. That is to say, certain of the brushes 19 will bridge or shunt related contact members 20 and by electro-mechanical means previously described contacts 60 will shunt the other contact members to complete an impulse circuit between contact members 20*a* or 20*m* and 20*g*. Taking, for example, the desired transmission of the impulse designated 8–4, it will be noted that brushes 19 at the 1, 2 and 8 index point positions will shunt their adjacent pairs of contact members.

At the impulse time designated 8–4 in Fig. 12, cam contacts SC8*a*, SC5*a*, SC4*a* will energize the respective electro-magnetic coils $53_4$, $53_X$ and $53_Y$, thereby closing related contacts 60 and shunting the remaining 4, X and Y pairs of contact members and thus completing a circuit between contact members 20*g* and 20*a*.

From the above description, it will be possible to easily trace out the manner of transmitting the remaining differentially timed impulses, it being noted that the perforations utilized to represent a certain designation effect the shunting of certain of the pairs of contact members 20, and at the time the differential impulses are transmitted the remaining contact members are shunted, due to closure of certain contacts 60 by the energization of the desired coils 53 effected by the related cam contacts SC4*a*–SC9*a*.

It will be seen in Fig. 11 that by multiple wiring cam contacts SC4*a*–SC9*a* are commonly wired to simultaneously energize the two sets of coils 53 for the two decks.

*Operation of analyzer and emitter for duo-deck 1, 2, 4, 7 coded cards*

Figure 13:
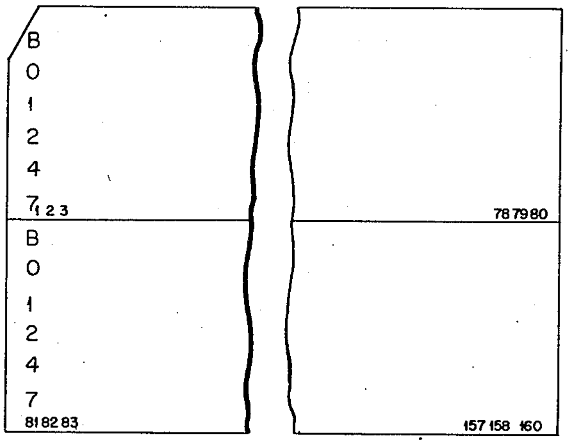
Fig. 13 is a view of a duo-deck card coded according to the 1, 2, 4, 7 code.
Figure 14:
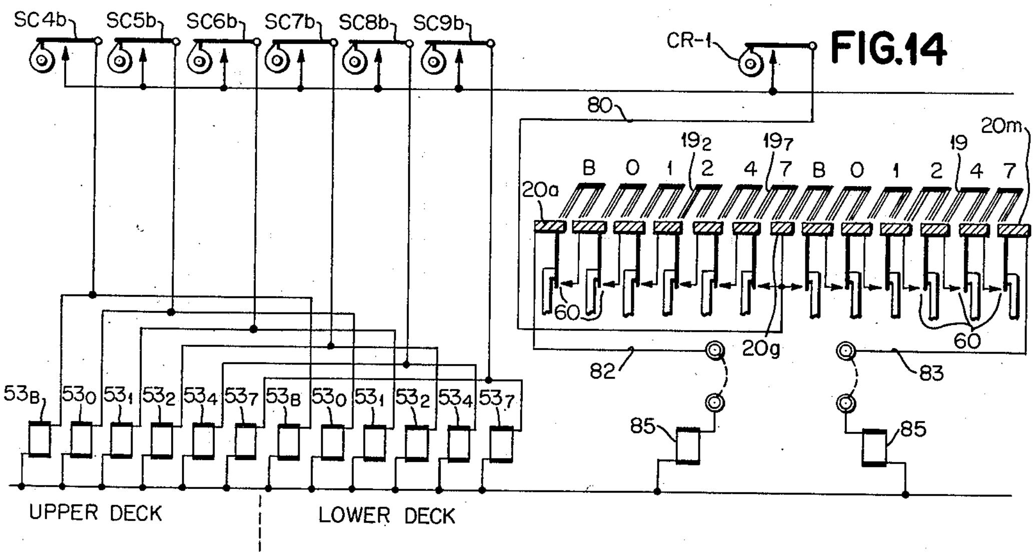
Fig. 14 is a wiring diagram of the circuit connections for analyzing the card using the 1, 2, 4, 7 code.
Figure 15:
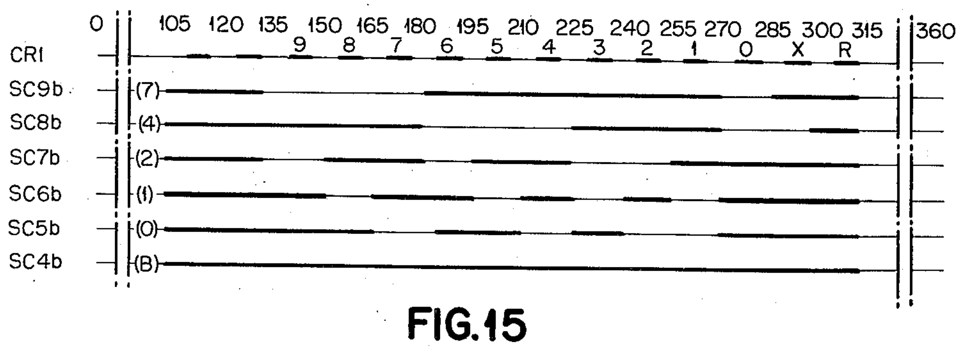
Fig. 15 is a timing diagram for the circuit of Fig. 14.

To further show the adaptation of the present invention for analysis of a different type of combinationally coded card, reference may be had to Figs. 13, 14 and 15 which show another modified arrangement. In order to simplify the illustration, it is assumed that such 0, 1, 2, 4, 7 coded card, which is known as the "2 out of 5" code, is perforated to represent only digits. The following table represents the code for the digits 0–9 and explains the two holes employed in the combinations:

TABLE II

| | |
|---|---|
| 9= | a 7 perforation plus a 2 perforation |
| 8= | a 7 perforation plus a 1 perforation |
| 7= | a 7 perforation plus a 0 perforation |
| 6= | a 4 perforation plus a 2 perforation |
| 5= | a 4 perforation plus a 1 perforation |
| 4= | a 4 perforation plus a 0 perforation |
| 3= | a 2 perforation plus a 1 perforation |
| 2= | a 2 perforation plus a 0 perforation |
| 1= | a 1 perforation plus a 0 perforation |
| 0= | a 7 perforation plus a 4 perforation |

The impulse transmitting circuits, the analyzer mechanism and the timing diagram are suitably modified to nevertheless incorporate the novel principle of the present invention. As shown in Fig. 13, this form of card is a duo-deck type, doubling the capacity of digit representation over the "IBM" form of card shown in Fig. 10.

The source of digit representing impulses is derived from the CR1 contacts and a circuit extends by a wire 80 from contacts CR1 to contact member 20*g* so that the series circuit may be completed by the relay contacts 60 and the bridging brushes 19 to either of the contact members 20*a* and 20*m*. By wires 82 and 83 impulses are transmitted through suitable plugs and plug connections to control magnets 85 receptive to these digit pulses for printing or accumulating control. Because the code utilizes only five digit positions the 6th or B index point position remains blank and for proper operation of the circuit the SC4*b* cam contact is adapted to energize the coils 53B to thereby bridge the contact members at this index point position continuously through the impulse digit transmitting portion of the cycle. Except for this change in the wiring diagram, the cam contacts SC5*b*–SC9*b* will energize respective coils 53 at successive digit impulse transmitting times to close certain of the contacts 60 which are complementary to the brushes 19 which have passed through perforations.

For example, at the 9 digit impulse transmitting time the brushes $19_7$ and $19_2$ will bridge their related contact members, whereas the SC8*b*, SC6*b*, SC5*b*, as well as SC4*b* cam contacts will cause the closure of related contacts 60 to shunt the remaining contact members 20. Hence, a circuit will be completed between the contact member 20*a* and 20*g* to cause a 9 digit impulse to be transmitted to a selected magnet 85. As described for the other form of duo-deck card, the six SC*b* cam contacts transmit energizing impulses to the sets of magnets 53 for both the upper and lower decks simultaneously. However, which columns are selected for operation is dependent upon the plug wire connections.

The same mode of operation is carried out for transmitting the remaining digits and can easily be traced out, it being noted that in each case the brushes for the combination of holes to represent a certain digit, cause the shunting of certain contact members 20 and the remaining contact members in the impulse circuit are shunted by the electromechanical contacts 60 under control of selected SC*b* cam contacts.

While there have been shown and described and pointed out the fundamental novel features of the invention as applied to several modifications, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A record perforation analyzer comprising a plurality of pairs of contact elements in series in a work impulse circuit, there being one pair for each perforation, means comprising record perforation analyzing means movable through the record perforations to contact pairs of said contact elements for initially shunting one or more pairs of contact elements in accordance with the perforations analyzed, and further means for shunting the other pairs of contact elements comprising those not initially shunted by said analyzing means to thereby complete said work circuit.

2. A record perforation analyzer comprising a record supporting bed plate carrying insulated pairs of contact elements, one pair for each index point position, a plurality of analyzing elements disposed over said pairs of contact elements for shunting related pairs of contact elements when said analyzing elements pass through holes at said index point positions to close a work circuit through these shunted contact elements at these points in the circuit, and supplemental means for successively shunting said pairs of contact elements in different groups which consists of those not shunted by said analyzing elements, whereby said work circuit is completed at differential times through the contact elements shunted by said analyzing elements and the contact elements shunted by said supplemental means.

3. A record perforation analyzer comprising a plurality of analyzing elements, each adapted to pass through the related perforation, a plurality of pairs of contact members insulated from each other and in series connection in a work impulse circuit, there being one pair of contact members for each analyzing element, means for moving said analyzing elements relative to said contact members to cause each analyzing element passing through a perforation to electrically bridge a related pair of contact members, and means for electrically bridging at differential times the remaining pairs of contact members of said plurality of pairs to complete the work circuit.

4. A record perforation analyzer comprising a card supporting bed plate carrying insulated pairs of contact elements, one pair for each index point position, a plurality of analyzing elements disposed over said pairs of contact elements for shunting related pairs of contact elements when said analyzing elements pass through holes at said index point positions to partially close a work circuit through these shunted contact elements, supplemental means for successively shunting at differential times said pairs of contact elements in different groups which consists of those not shunted by said analyzing elements, whereby said work circuit is fully completed through the contact elements shunted by said analyzing elements and the contact elements shunted by said supplemental means at differential times, and means for transmitting an impulse to said work circuit and contact elements each time said pairs of contact elements are shunted in different groups to transmit said impulse when all of said pairs of contact elements are shunted to an electrical control device in said circuit.

5. A record perforation analyzer comprising a reciprocable support member, a plurality of insulating plates carried by said member supporting a plurality of analyzing elements for each record column and insulated from each other, a lower bed plate supporting a perforated card and carrying for each column pairs of insulated contact elements, said analyzing elements and the associated pairs of contact elements being so disposed that a pair of contact elements are shunted by the related analyzing element passing through a hole, electromagnetic means for shunting the pairs of contact elements, and electrical impulsing means for energizing said electromagnetic means to successively shunt the pairs of contact elements in different groups, whereby the shunting of a pair of contact elements by said analyzing elements and the remaining contact elements by said electromagnetic means completes at differential impulse times a work impulse circuit.

6. An analyzing mechanism for analyzing a perforated record having rows of index points comprising a plurality of rows of contact elements, each row being provided with a plurality of pairs of contact elements, one pair for each index point, a plurality of rows of insulated analyzing elements, each analyzing element adapted to electrically shunt the related pair of contact elements through a record perforation, a plurality of relay contact wires, each relay contact wire being connected to one contact element and adapted to be shifted to shunt said one contact element and an adjacent contact element, a series of solenoids, means actuated by said solenoids for shifting the related contact wires to shunt pairs of contact elements, and means for successively energizing said solenoids in different groups, each group energized adapted to shift contact wires to shunt pairs of contact elements in each row which consist of those in the same row which are not shunted by the analyzing elements.

7. An analyzing mechanism for analyzing a perforated record having rows of index points comprising a lower bed plate supporting a record and carrying a plurality of rows of contact elements, each row being provided with a plurality of pairs of contact elements, one pair for each index point, a plurality of rows of analyzing elements, means for moving said analyzing elements relative to said bed plate to cause each analyzing element to make electrical contact with the related pair of contact elements through a record perforation, a plurality of relay contact wires beneath said lower bed plate, each relay contact wire being connected to one contact element and adapted to be shifted to be electrically connected to an adjacent contact element to shunt a pair of adjacent contact elements, a series of solenoids, means actuated by said solenoids for shifting the related contact wires to shunt pairs of contact elements, and timed electrical impulsing means for successively energizing said solenoids in different groups, each group energized adapted to shift contact wires to shunt pairs of contact elements in each row which consist of those in the same row which are not shunted by the analyzing elements.

8. An analyzing mechanism for analyzing a perforated record having rows of index points comprising a lower bed plate supporting a record and carrying a plurality of rows of contact elements in series in a work circuit, each row being provided with a plurality of pairs of contact elements, one pair for each index point, a plurality of rows of analyzing elements, means for moving said analyzing elements relative to said bed plate to cause each analyzing element to make electrical contact with the related pair of contact elements through a record perforation, a plurality of relay contact wires beneath said lower bed plate, each relay contact wire being connected to one contact element and adapted to be shifted to be connected to an adjacent contact element to shunt a pair of adjacent contact elements, a series of solenoids, means actuated by said solenoids for shifting the related contact wires to shunt pairs of contact elements, timed electrical impulsing means for successively energizing said solenoids in different groups, each group energized adapted to shift contact wires to shunt pairs of contact elements in each row which consist of those in the same row which are not shunted by the analyzing elements, and means for transmitting an impulse to said work circuit and contact elements and to an electrical control member in said work circuit each time said pairs of contact elements are shunted in different groups.

No references cited.